US009092910B2

(12) United States Patent  
Perry et al.

(10) Patent No.: US 9,092,910 B2  
(45) Date of Patent: Jul. 28, 2015

(54) SYSTEMS AND METHODS FOR CLOUD PROCESSING AND OVERLAYING OF CONTENT ON STREAMING VIDEO FRAMES OF REMOTELY PROCESSED APPLICATIONS

(71) Applicants: David Perry, Monarch Beach, CA (US); Rui Filipe Andrade Pereira, Aliso Viejo, CA (US); Noam Rimon, Foster City, CA (US)

(72) Inventors: David Perry, Monarch Beach, CA (US); Rui Filipe Andrade Pereira, Aliso Viejo, CA (US); Noam Rimon, Foster City, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 101 days.

(21) Appl. No.: 13/767,806

(22) Filed: Feb. 14, 2013

(65) Prior Publication Data

US 2013/0162680 A1  Jun. 27, 2013

Related U.S. Application Data

(63) Continuation-in-part of application No. 12/826,130, filed on Jun. 29, 2010, now Pat. No. 8,968,087, which is a continuation-in-part of application No. 12/791,819, filed on Jun. 1, 2010.

(Continued)

(51) Int. Cl.
*A63F 9/24* (2006.01)
*G06T 11/60* (2006.01)
*G06T 11/00* (2006.01)

(52) U.S. Cl.
CPC ............... *G06T 11/60* (2013.01); *G06T 11/00* (2013.01); *A63F 2300/534* (2013.01)

(58) Field of Classification Search
CPC .............. G06T 2207/10016; G06T 7/2053; G06T 11/60; G06F 17/3079; G06F 3/04817; G06F 17/30253; A63F 2300/203; A63F 2300/538; G06K 9/3241
USPC ...................................................... 463/31, 42
See application file for complete search history.

(56) References Cited

U.S. PATENT DOCUMENTS

| 2004/0006767 | A1 * | 1/2004 | Robson et al. .................. 725/28 |
| 2004/0049780 | A1 * | 3/2004 | Gee ................................. 725/32 |
| 2005/0212968 | A1 * | 9/2005 | Ryal .............................. 348/565 |
| 2006/0130119 | A1 * | 6/2006 | Candelore et al. ............ 725/135 |
| 2009/0202114 | A1 | 8/2009 | Morin et al. |

(Continued)

FOREIGN PATENT DOCUMENTS

WO  WO-2012/087641 A2   6/2012

OTHER PUBLICATIONS

PCT/US2013/069947, International Search Report and Written Opinion of the International Searching Authority (EP), Mailed Feb. 3, 2014.

*Primary Examiner* — Steve Rowland
(74) *Attorney, Agent, or Firm* — Martine Penilla Group, LLP

(57) ABSTRACT

A first application executes on one or more computing systems to generate a series of original frame pixel data sets for rendering of graphical images associated with the first application execution. A second application executes on one or more computing systems to detect one or more key graphical images present in the series of original frame pixel data sets. Upon detection of the one or more key graphical images, the second application directs replacement of a portion of pixel data in the series of original frame pixel data sets with substitute pixel data so as to generate a series of modified frame pixel data sets for encoding in lieu of the series of original frame pixel data sets.

24 Claims, 10 Drawing Sheets

Related U.S. Application Data

(60) Provisional application No. 61/727,370, filed on Nov. 16, 2012, provisional application No. 61/354,699, filed on Jun. 14, 2010, provisional application No. 61/183,035, filed on Jun. 1, 2009, provisional application No. 61/183,037, filed on Jun. 1, 2009, provisional application No. 61/183,088, filed on Jun. 2, 2009, provisional application No. 61/183,546, filed on Jun. 2, 2009, provisional application No. 61/323,354, filed on Apr. 12, 2010, provisional application No. 61/345,534, filed on May 17, 2010.

(56) References Cited

U.S. PATENT DOCUMENTS

| | | | |
|---|---|---|---|
| 2011/0126110 A1* | 5/2011 | Vilke et al. | 715/736 |
| 2012/0269494 A1 | 10/2012 | Satyanarayana et al. | |

* cited by examiner

SYSTEMS AND METHODS FOR CLOUD PROCESSING AND OVERLAYING OF CONTENT ON STREAMING VIDEO FRAMES OF REMOTELY PROCESSED APPLICATIONS

CLAIM OF PRIORITY

This application claims priority under 35 U.S.C. 119(e) to U.S. Provisional Patent Application No. 61/727,370, filed Nov. 16, 2012, entitled "Systems and Methods for Cloud Processing and Overlaying of Content on Streaming Video Frames of Remotely Processed Applications," the disclosure of which is incorporated herein by reference in its entirety.

This application is a continuation-in-part application under 35 U.S.C. 120 of prior U.S. patent application Ser. No. 12/826,130, filed Jun. 29, 2010, entitled "Video Game Overlay," which 1) claims priority to U.S. Provisional Patent Application No. 61/354,699, filed Jun. 14, 2010, entitled "Video Game Overlay," and 2) is a continuation-in-part of U.S. patent application Ser. No. 12/791,819, filed Jun. 1, 2010, entitled "Qualified Video Delivery," which in turn claims priority to each of the following U.S. Provisional Patent Applications Nos.:

61/183,035, filed Jun. 1, 2009, entitled "Game Server Architecture,"

61/183,037, filed Jun. 1, 2009, entitled "Bufferless H.264 Variant,"

61/183,088, filed Jun. 2, 2009, entitled "I/O Level Virtualization,"

61/183,546, filed Jun. 2, 2009, entitled "Self-Spawning Game Environments,"

61/323,354, filed Apr. 12, 2010, entitled "Artificial Frames," and

61/345,534, filed May 17, 2010, entitled "Dynamic Game Server Including Qualifier."

Each of the above-identified U.S. patent applications and U.S. Provisional patent applications is incorporated herein by reference in its entirety.

This application is also related to the following U.S. patent applications:

Ser. No. 12/790,948, filed May 31, 2010, entitled "Bufferless H.264 Variant," and Ser. No. 12/790,995, filed May 31, 2010, entitled "Game Execution Environments."

Each of the above-identified U.S. patent applications is incorporated herein by reference in its entirety.

BACKGROUND

There are several models for the execution and rendering of video games. In the most simple model a game is executed and rendered on a computing device local to a player of the game. In another model a game state is maintained at a central server and communicated over a computing network to a client where rendering of video takes place.

This model is commonly used by multi-player games in which the game state is dependent on inputs received over the computing network from multiple players of the game. In a third model a game state is maintained at a central server that also renders video for delivery to clients over a computing network as a video stream.

SUMMARY

The embodiments disclosed herein relate to systems and method for cloud processing of applications and streaming of video frames of the cloud processing to a remote client. The cloud processing can include applications that process and output video frames of a first application (e.g., a video game) to examine the image content, and based on the examination, overlay content can be integrated into video frames being transferred to the remote client. In one embodiment, the overlay content can be merged with existing image content being output by the first application. The merging can be processed in various ways, and without limitation, merging can include replacing pixels in specific frames or sets of frames, tracking detected image objects and replacing pixels for the detected image objects as they move from frame to frame or over time.

In some examples, the overlay process is optimized so that the video frames received by the user of the client device will not detect that overlay processing was performed (e.g., on the client's display), and the output looks as if the native application (e.g., first application) produced the frames. In various examples, the first application can be a video game application. In a system that allows for online web play, a user with an account may be provided with a large library of video games to choose from, which can be thought of as first applications. In this context, many users can be provided with accounts and many users can select games and play simultaneously, either alone or in multi-player mode with friends of a social network. During the remote execution of first applications, one or more remotely executed applications examine and process the video frames that are the output of the first applications. These remotely executed applications perform the overlay process and can sync with game play to provide a new experience that was not originally part a native application.

As will be discussed below, the servers that process the applications remotely may be referred to as cloud processing systems. The cloud processing systems can utilize many servers, which may use virtualization hardware and software, and the cloud processing systems may be distributed among more than one data center. Well placed data centers allow for reduced delay in streaming by their geographic distributed. In some embodiments, load balancing may be used to reduce delay and improve the performance of the remote game play.

In one embodiment, a system for augmenting a remotely served application is disclosed. The system includes a first application executing on one or more computing systems to generate a series of original frame pixel data sets for rendering of graphical images associated with the first application execution. The system also includes a second application executing on one or more computing systems to detect one or more key graphical images present in the series of original frame pixel data sets. Upon detection of the one or more key graphical images, the second application directs replacement of a portion of pixel data in the series of original frame pixel data sets with substitute pixel data so as to generate a series of modified frame pixel data sets for encoding in lieu of the series of original frame pixel data sets.

In one embodiment, a method is disclosed for augmenting a remotely served application. The method includes searching a video frame generated by an application to detect a key graphical image. The method includes detecting the key graphical image in the video frame. The method includes obtaining an overlay image representing a universal achievement status of the user. The method includes correlating the user's determined universal achievement status to one or more of a number of predefined overlay images stored on a data storage device. The method includes acquiring overlay construction data from the data storage device for at least one of the number of predefined overlay images correlated to the user's determined universal achievement status. The method also includes supplying the acquired overlay construction data to overlay logic for insertion of the at least one of the predefined overlay images in the video frame.

In one embodiment, a data storage device having program instructions stored thereon for augmenting a remotely served application is disclosed. The data storage device includes program instructions for searching a video frame generated by an application to detect a key graphical image. The data storage device includes program instructions for detecting the key graphical image in the video frame. The data storage device includes program instructions for obtaining an overlay image representing a universal achievement status of the user. The data storage device includes program instructions for correlating the user's determined universal achievement status to one or more of a number of predefined overlay images stored on a data storage device. The data storage device includes program instructions for acquiring overlay construction data from the data storage device for at least one of the number of predefined overlay images correlated to the user's determined universal achievement status. The data storage device also includes program instructions for supplying the acquired overlay construction data to overlay logic for insertion of the at least one of the predefined overlay images in the video frame.

Other aspects of the invention will become more apparent from the following detailed description, taken in conjunction with the accompanying drawings, illustrating by way of example the present invention.

DETAILED DESCRIPTION

Figure 1:
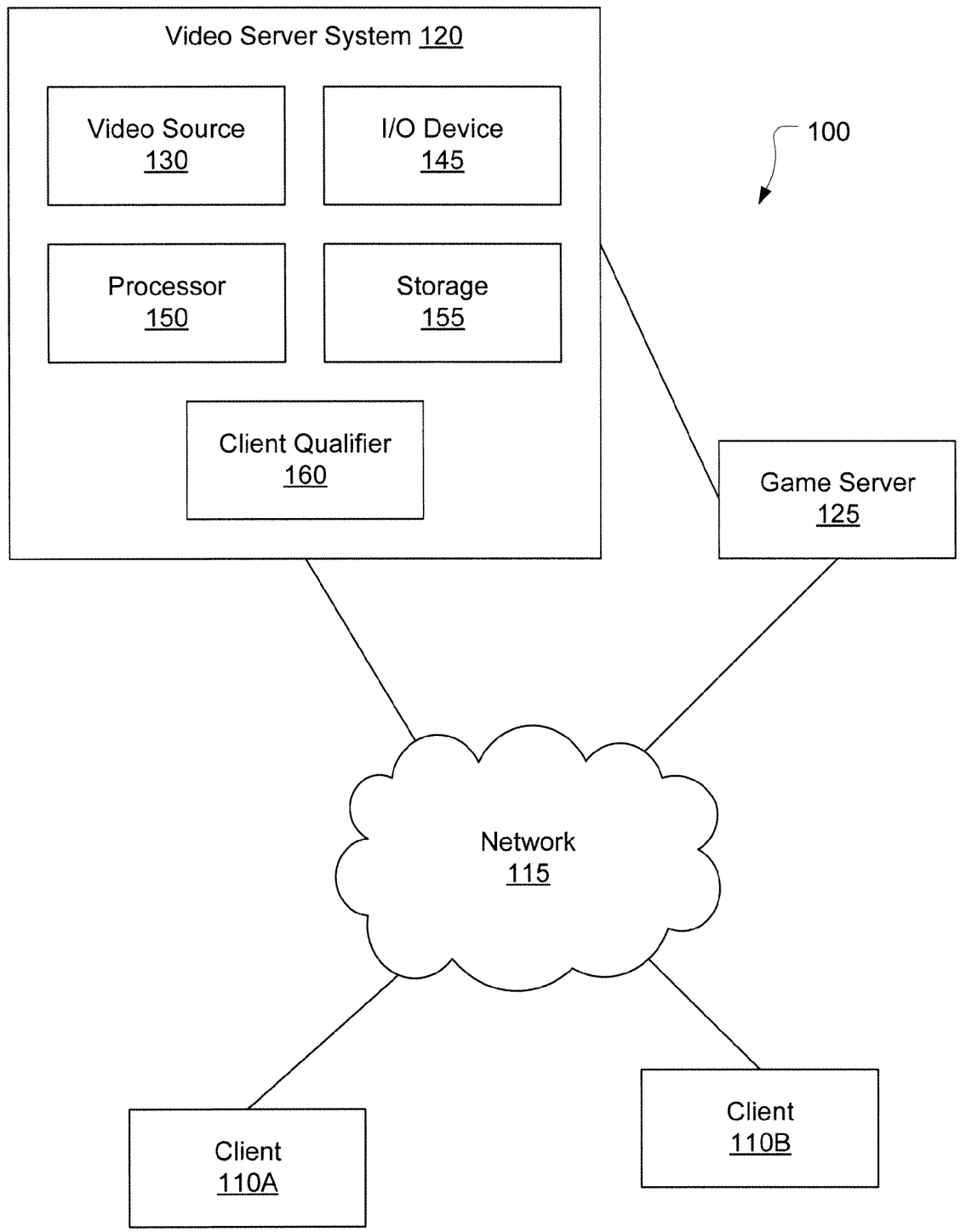
FIG. 1 is a block diagram of a game system, according to various embodiments of the invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

A pixel data set of a display frame image generated by a computer application executing on a first computing system, i.e., server system/cloud system, for transmission over a network, to be displayed by a second computing system, is intercepted in route from the computer application to the network. An identification is made of a target portion of the intercepted pixel data set corresponding to visual content to be modified in the display frame image. A revised pixel data set is generated for the display frame image in which the target portion of the intercepted pixel data is modified to alter the corresponding visual content in the display frame image. The revised pixel data set is provided in place of the intercepted pixel data set for transmission over the network to be displayed by the second computing system. The computer application is unaware of the pixel data set interception and revision.

A system is disclosed herein for augmenting a remotely served application, in accordance with one embodiment of the present invention. The system includes a frame augmentation module defined to intercept a pixel data set of a display frame image generated by a computer application executing on a first computing system for transmission over a network to be displayed by a second computing system, i.e., by a user's computing system. The frame augmentation module is defined to identify a target portion of the intercepted pixel data set corresponding to visual content to be modified in the display frame image, i.e., corresponding to a key graphical image. The frame augmentation module is defined to generate a revised pixel data set for the display frame image in which the target portion of the intercepted pixel data is modified to alter the corresponding visual content in the display frame image. The frame augmentation module is defined to provide the revised pixel data set in place of the intercepted pixel data set for transmission over the network to be displayed by the second computing system. The frame augmentation module is defined separate from the computer application and operated independently from the computer application.

In various embodiments, the first computing system referred to above, on which the computer application is executing, is a cloud computing platform providing a virtual machine upon which the computer application is executed, and the network is the internet. Also, in various embodiments, the computer application is a computer game application.

In one example embodiment, the target portion of the intercepted pixel data set corresponds to visual content within the display frame image representing a user of the computer application. The revised pixel data set can be generated to modify an appearance of an object that would be depicted by a rendering of the target portion of the intercepted pixel data set. Also, the revised pixel data set can be generated to replace an object that would be depicted by a rendering of the target portion of the intercepted pixel data set with a depiction of a different object. Also, the revised pixel data set can be generated to depict an object overlying an image that would be depicted by a rendering of the target portion of the intercepted pixel data set.

In various embodiments, pixel data sets of display frame images are transmitted over the network in accordance with a first frame rate, and the frame augmentation module is defined to generate revised pixel data sets for display frame images in accordance with a second frame rate greater than the first frame rate. For example, in one embodiment, the second frame rate is twice the first frame rate.

The system for augmenting a remotely served application can also include an application extension module defined to provide computer executable instructions for processing user input signals related to the modified target portion of the intercepted pixel data as displayed by the second computing system. The computer application executes without an awareness of the computer executable instructions provided by the application extension module. In some instances, the frame augmentation module can be defined to generate the revised pixel data set based on direction received from the application extension module as a result of processing user input signals related to a previously modified target portion of intercepted pixel data having been displayed by the second computing system.

A method for augmenting a remotely served application includes executing a computer application on a first computing system, i.e., server system/cloud system, to generate pixel data sets of display frame images for transmission over a network to be displayed by a second computing system, i.e., user's computing system. The method includes an operation for intercepting a pixel data set of a display frame image generated by the computer application. It should be understood that the computer application executes without an awareness of the pixel data set interception. The method also includes an operation for identifying a target portion of the intercepted pixel data set corresponding to visual content to be modified in the display frame image. The method also includes an operation for generating a revised pixel data set for the display frame image in which the target portion of the intercepted pixel data is modified to alter the corresponding visual content in the display frame image. The method further includes an operation for transmitting the revised pixel data set in place of the intercepted pixel data set over the network to be displayed by the second computing system.

In various embodiments of the above-mentioned method, the first computing system is a cloud computing platform providing a virtual machine upon which the computer application is executed, and the network is the internet. Also, the computer application can be a computer game application. In some cases, the target portion of the intercepted pixel data set corresponds to visual content within the display frame image representing a user of the computer application.

In some embodiments, the pixel data sets of display frame images are generated by the computer application in accordance with a first frame rate, and the revised pixel data sets for the display frame images are generated in accordance with a second frame rate greater than the first frame rate. Then, the revised pixel data sets are transmitted over the network in accordance with the first frame rate in place of the intercepted pixel data sets. In some embodiments, the second frame rate is twice the first frame rate.

The method can also include processing user input signals related to the modified target portion of the intercepted pixel data as displayed by the second computing system. It should be understood that the computer application executes without an awareness of processing of the user input signals related to the modified target portion of the intercepted pixel data. In some embodiments, the revised pixel data set is generated based on a result of processing user input signals related to a previously modified target portion of intercepted pixel data having been displayed by the second computing system.

FIG. 1 is a block diagram of a game system 100, according to various embodiments of the invention. The game system 100 is configured to provide a video stream to one or more clients 110, separately numbered 110A, 110B, etc. by way of example, via a network 115. The game system 100 typically includes a video server system 120 and an optional game server 125. The video server system 120 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second, although higher or lower frame rates are included in alternative embodiments of the invention.

The clients 110, i.e., 110A, 110B, etc., may include terminals, personal computers, game consoles, tablet computers, telephones, set top boxes, kiosks, wireless devices, digital pads, stand-alone devices, handheld game playing devices, and/or the like. Typically, the clients 110 are configured to receive encoded video streams, decode the video streams, and present the resulting video to a user, e.g., a player of a game. The processes of receiving encoded video streams and/or decoding the video streams typically include storing individual video frames in a receive buffer of the client 110. The video streams may be presented to the user on a display integral to the client 110 or on a separate device such as a monitor or television.

The clients 110 are configured to receive video streams via the network 115. The network 115 may be any type of communication network, including a telephone network, the Internet, wireless networks, powerline networks, local area networks, wide area networks, private networks, and/or the like. In some embodiments, the video streams are communicated via standard protocols, such as TCP/IP or UDP/IP. Alternatively, the video streams can be communicated via proprietary standards.

A typical example of the clients 110 is a personal computer including a processor, non-volatile memory, a display, decoding logic, network communication capabilities, and input devices. The decoding logic may include hardware, firmware, and/or software stored on a computer readable medium, i.e., on a non-transitory data storage device. Systems for decoding (and encoding) video streams are well known in the art and vary depending on the particular encoding scheme used.

The video stream (and optionally audio stream) received by the clients 110 is generated and provided by the video server system 120. The video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g., to effect, the images shown to the user through rendering of the frame information in a visual display. Most of the disclosure provided herein with regard to "video frames" can also be applied to "audio frames."

The clients 110 are typically configured to receive inputs from a user. These inputs may include game commands configured to change the state of the video game or otherwise affect game play. The game commands can be received using input devices and/or may be automatically generated by computing instructions executing on the clients 110. Input devices of the clients 110 may include, for example, a keyboard, a joystick, a pointing device, a force feedback device, a motion and/or location sensing device, a mouse, a touch screen, a neural interface, a camera, input devices yet to be developed, and/or the like. The received game commands are communicated from the clients 110 via the network 115 to the video server system 120 and/or the game server 125.

The game server 125 can be optionally operated by a different entity than the video server system 120. For example, the game server 125 may be operated by the publisher of a multiplayer game. In this example, the video server system 120 is optionally viewed as a client by the game server 125 and optionally configured to appear from the point of view of the game server 125 to be a client executing a game engine. Communication between the video server system 120 and the game server 125 optionally occurs via the network 115. As such, the game server 125 can be a multiplayer game server that sends game state information to multiple clients, one of which is video server system 120.

The video server system 120 includes a video source 130, an I/O (input/output) device 145, a processor 150, and non-transitory data storage 155. The video server system 120 may include one computing device or be distributed among a plurality of computing devices. These computing devices are optionally connected via a communications system such as a local area network.

The video source 130 is configured to provide a video stream, e.g., streaming video or a series of video frames that form a moving picture. In some embodiments, the video source 130 includes a video game engine and rendering logic. The video game engine is configured to receive game commands from a player and to maintain a copy of the state of the video game based on the received commands. This game state includes the position of objects in a game environment, and may also include a point of view of the user. The game state may also include properties, images, colors and/or textures of objects. The game state is typically maintained based on game rules, as well as game commands such as move, turn, attack, set focus to, interact, use, and/or the like. Part of the game engine is optionally disposed within the game server 125. The game server 125 may maintain a copy of the state of the game based on game commands received from multiple players using geographically disperse clients. In these cases, the game state is provided by the game server 125 to the video source 130, where a copy of the game state is stored and rendering is performed. The game server 125 may receive game commands directly from clients 110 via the network 115, and/or may receive game commands via the video server system 120.

The video source 130 can include rendering logic, e.g., hardware, firmware, and/or software stored on a computer readable medium, such as the non-transitory data storage 155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to the clients 110. The raw video may be encoded using any available encoding method for which the remote device has a compatible decoding capability. The encoding process produces a video stream that is optionally packaged for delivery to a decoder on a remote device.

The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example and without limitation, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

The video source 130 is optionally configured to provide overlays configured to be placed on other video. For example, these overlays may include a command interface, log-in instructions, messages to a game player, images of other game players, video feeds of other game players (e.g., webcam video). In an example embodiment in which at least one of the clients 110 includes a touch screen interface, the overlay may include a virtual keyboard, joystick, touch pad, and/or the like. Also, in one example embodiment, an overlay of a player's voice is overlaid on an audio stream. The video source 130 may also include one or more audio sources.

In various embodiments, the I/O device 145 can be configured for the video server system 120 to send and/or receive information such as video, commands, requests for information, a game state, client identities, player identities, game commands, security information, audio, and/or the like. The I/O device 145 can include communication hardware such as a network card or modem. The I/O device 145 is configured to communicate with the game server 125, the network 115, and/or the clients 110.

The processor 150 is configured to execute logic, e.g., software, included within the various components of the video server system 120 discussed herein. For example, the processor 150 may be programmed with software instructions in order to perform the functions of the video source 130, the game server 125, and/or a client qualifier 160. The video server system 120 optionally includes more than one instance of the processor 150. The processor 150 may also be programmed with software instructions in order to execute commands received by the video server system 120, or to coordinate the operation of the various elements of the game system 100 discussed herein. The processor 150 may include one or more hardware devices. It should be understood that the processor 150 is an electronic processor, i.e., a computer processor.

The video server system 120 optionally includes the client qualifier 160 which is configured to remotely determine the capabilities of the clients 110. These capabilities can include both the capabilities of a given client 110 itself, and the capabilities of one or more communication channels between the given client 110 and the video server system 120. For example, the client qualifier 160 may be configured to test a communication channel through the network 115.

Figure 2:
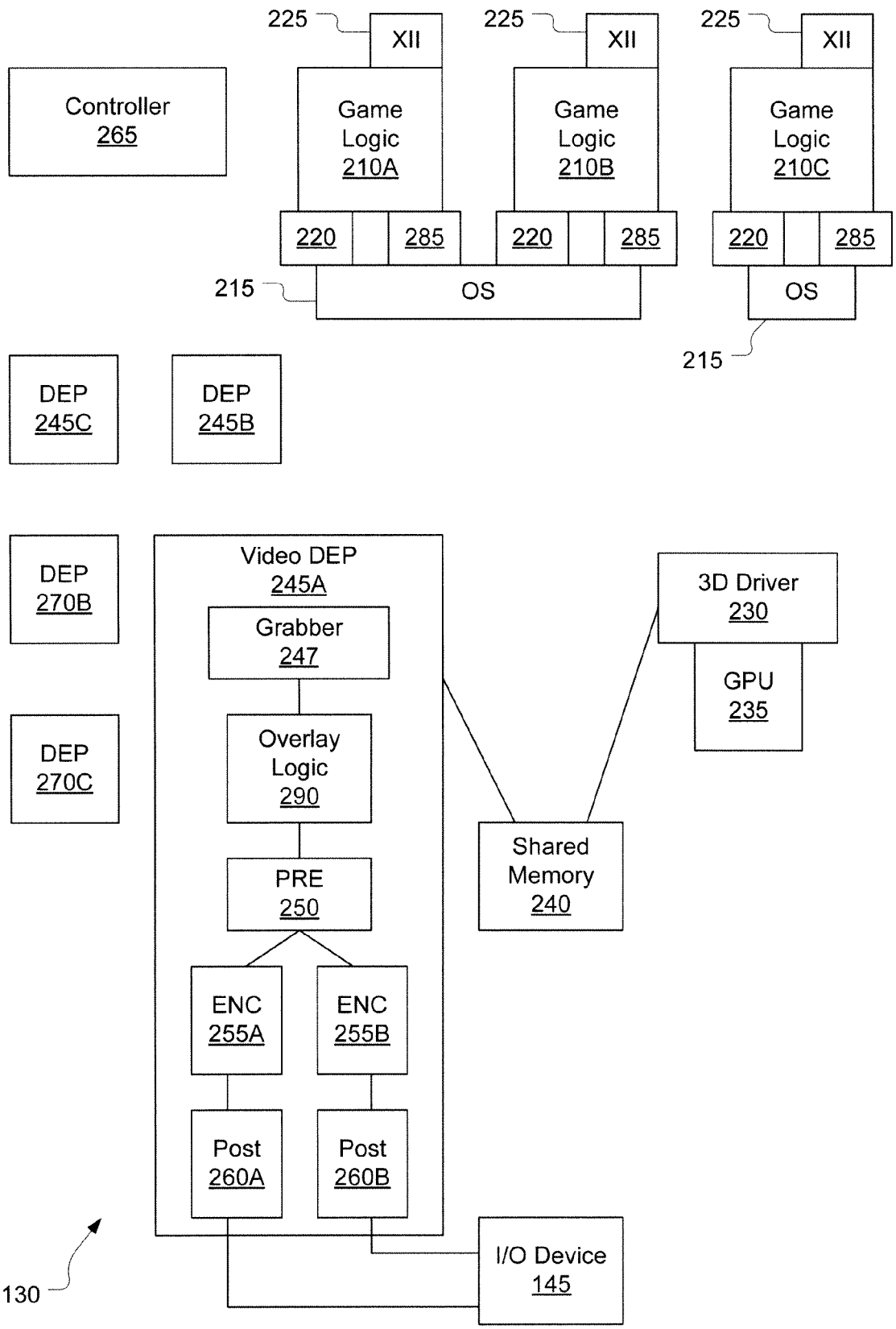
FIG. 2 is a block diagram of embodiments of the video source configured to serve multiple video games.

FIG. 2 is a block diagram of embodiments of the video source 130 configured to serve multiple video games. The multiple video games can include multiple instances of the same video game and/or instances of different video games. The video games are optionally multiplayer games. For example, a game state of one or more of the video games may be maintained by one or more instances of the game server 125, each based on inputs received from multiple clients 110.

The video games are executed using different instances of game logic 210, individually labeled 210A, 210B, 210C, etc. The game logic 210 is configured to use a game state to determine a game environment that can be rendered to a video stream configured to be presented to a game player. In some embodiments, the game environment is a three dimensional virtual environment including game objects, avatars, location of objects, their shapes, textures, and spatial relationships therebetween, and the like. A game environment can include vertex data, transformation data and texture data, and/or the like.

The rendering is typically based on one or more point of views associated with a specific game player. The video source 130 can include multiple instances of the game logic 210. The game logic 210 can optionally be a client of the game server 125 and may be configured to communicate with game server 125 via the network 115.

The game logic 210 is configured to receive game commands from one or more clients 110 and to process the received commands according to a set of game rules. These rules cover, for example, how avatars interact with other avatars or in game objects, avatar movement, game instance management, and/or the like. The game logic 210 includes hardware, firmware, and/or software stored on a computer readable medium.

Each instance of the game logic 210 can be disposed on a separate computing device, or several instances of the game logic 210 can be disposed on the same computing device, or a single instance of the game logic 210 can be disposed across multiple computing devices. Game instances can dynamically change the number and/or identify of computing devices used depending on the requirements of the game environment the user is currently experiencing. Instances of the game logic 210 disposed on the same computing device are optionally executed within separate virtual machines or virtual I/O shells. In some embodiments, different instances of the game logic 210 are configured to communicate game commands and/or game state information directly to each other, e.g., without necessarily communication through the game server 125.

The game logic 210 can execute on top of an operating system (OS) 215. The operating system 215 may include Windows™, Linux, Unix, Mac OS™, Solaris™ and/or the like. In some embodiments, the operating system 215 and game logic 210 can operate on one or more virtual machine platforms such as ESX, Hyper-V, and/or the like. In these embodiments, one or more instances of the game logic 210 can be executed within a virtual machine. Also, multiple instances of the game logic 210 may execute on the same instance of the operating system 210. For example, FIG. 2 shows the game logic 210A and the game logic 210B both executing on the same operating system 215. Multiple instances of game logic 210 executing on the same operation system 215 may, or may not, be configured for playing the same video game.

In some embodiments, the game environments determined by the game logic 210 are passed to an optional virtual 3D video driver 220. The virtual 3D video driver 220 is configured to appear, from the point of view of the game logic 210, as a non-virtual 3D video driver controlling a graphics processing unit. Each instance of the game logic 210 may be associated with its own instance of the virtual 3D video driver 220, or the virtual 3D video driver 220 may be shared by two or more instances of the game logic 210.

The virtual 3D video driver 220 is further configured to pass the received game environments to a (non-virtual) 3D driver 230. Optionally, the delivery of game environments to 3D driver 230 is coordinated by the various instances of the virtual 3D video driver 220. For example, delivery can be coordinated such that 3D driver 230 receives game environments from one (or a minimum number of) virtual 3D video driver 220 at a time. In some embodiments, each of the virtual 3D video drivers 220 is configured such that they appear to be a separate process and a separate source of video data to 3D driver 230. As such, 3D driver 230 is configured to keep track of which video data results in which video frames after rendering.

The video data received by 3D driver 230 are passed to graphics processing unit (GPU) 235 for rendering into raw video frames. The graphics processing unit 235 is optionally used to render more than one video stream in parallel. The parallel production of video streams includes the generation of these streams at the same time. However, parallel production of video streams may, but does not necessarily, include the processing of individual frames at the same time within the graphics processing unit 235. For example, in some embodiments 3D driver 230 alternatively passes the video data generated by the various members game logic 210 to the graphics processing unit 235. Data generated by game logic 210A is used to make a video frame, and subsequently data generated by game logic 210B is used to make a video frame, etc. In this case, the video streams are produced in parallel while individual frames are produced in series.

The virtual 3D video drivers 220 can be configured to manage the transfer of raw rendered video frames from 3D driver 230. For example, the virtual 3D drivers 220 may be used to coordinate the transfer of video frames from the control of 3D driver 230 to a shared memory 240. Following rendering, the video frames are in a memory of the graphics processing unit 235 or in a memory managed by the 3D driver 230. In either case, they are under the control of the 3D driver 230. As the virtual 3D video drivers 220 manage the communication of video data and frames to and from 3D driver 230, in some embodiments, they are capable of placing the video frames within parts of the shared memory 240 associated with specific video dynamic encoding pipelines (DEPs) 245. The video DEPs 245 are individually identified as video DEP 245A, DEP 245B, DEP 245C, etc. In some embodiments, each video DEP 245 is assigned specific memory locations within the shared memory 240, and is configured to retrieve video data from those memory locations.

The shared memory 240 includes random access memory (RAM) or a similar memory configured for efficient reading and writing of video data. The shared memory 240 is configured to store video data for a plurality of different video DEPs 245. Video data for different video DEPs 245 is optionally stored at the same time in shared memory 240. The shared memory 240 may consist of a single hardware device or may include multiple devices.

The video DEPs 245 are dynamically allocated encoding pipelines that are each configured to encode video data rendered using the graphics processing unit 235. Each member of video DEPs 245 is configured to encode to video formats specified at the time the video DEP 245 is provisioned. This format specification is typically based on the needs of one of clients 110 and/or the capabilities of the communication path between the video server system 120 and the client 110. The video DEPs 245 are optionally provisioned dynamically in response from a request from one of clients 110. A member of video DEPs 245 can optionally be configured to use more than one encoding scheme.

Each video DEP 245 includes a grabber 247 configured to grab video data from the shared memory 240 and transfer this video data to a memory of the video DEP 245. Each video DEP 245 optionally includes a preprocessor (PRE) 250 configured to perform a color space conversion such as RGB to YUV and/or a scaling operation to increase or decrease the resolution of the video frame. The preprocessor 250 is optional in embodiments wherein the output of the graphics processing unit 235 is in the YUV color space or some other desired color space. Multiple preprocessors 250 may be included in a video DEP 245 configured to produce multiple video streams having video frames of different sizes.

Each video DEP 245 includes at least one encoder (ENC) 255. By way of example in FIG. 2, encoders 255 are individually identified as encoder 255A, encoder 255B, etc. Each encoders 255 is configured to encode the video data according to a specific codec, and optionally a specific color depth and/or frame size.

In some embodiments, video DEPs 245 are configured to use two or more different encoders to generate two or more different video streams at the same time. These video streams are based on the same game environment rendered by the graphics processing unit 255 and, thus, include essentially the same materials (with the possible exception of overlays) and can be sent to different places. For example, one of the video streams can be sent to the client 110A while the other is sent to the client 110B. Alternatively, one of the video streams can be sent to the client 110A and the other to a website where third parties can watch the video. This website is optionally part of a social networking site or a game player's site. The two different video streams may be different in the frame rate, encoding type, frame size, color depth, etc. For example a video stream delivered to a social networking website can be of much lower quality than the video stream delivered to a game player who is playing a game using the client 110A. The second video stream may be directed to a game player who is playing the game or to people who are merely observing the game play. A video stream is optionally directed to more than one place.

The video DEP 245A can optionally include one or more post processors (Post) 260. Individual examples of post processors 260 are labeled 260A and 260B. The post processors 260 are configured to package an encoded video frame in a container in a format appropriate for communication over a network according to a public or proprietary network protocol. For example, some protocols such as Adobe RTMP require post processing while other video standards such as H.264 Annex B do not require post processing. Each of the post processors 260 may be associated with a specific member of encoders 255, or several post processors 260 may be configured to receive encoded video frames from one member of encoders 255.

The output of post processors 260 is directed to I/O Device 145 for delivery to one or more of the clients 110. The elements of video DEPs 245 discussed herein include hardware, firmware and/or software stored on a computer readable medium. For example, each of the video DEPs 245 may represent a set of software loaded into memory and executing using an electronic processor.

The operation of the video source 130 is typically managed by a controller 265. The controller 265 includes hardware, firmware and/or software stored on a computer readable medium. For example, the controller 265 may include software stored in memory and executed using a microprocessor.

Figure 3:
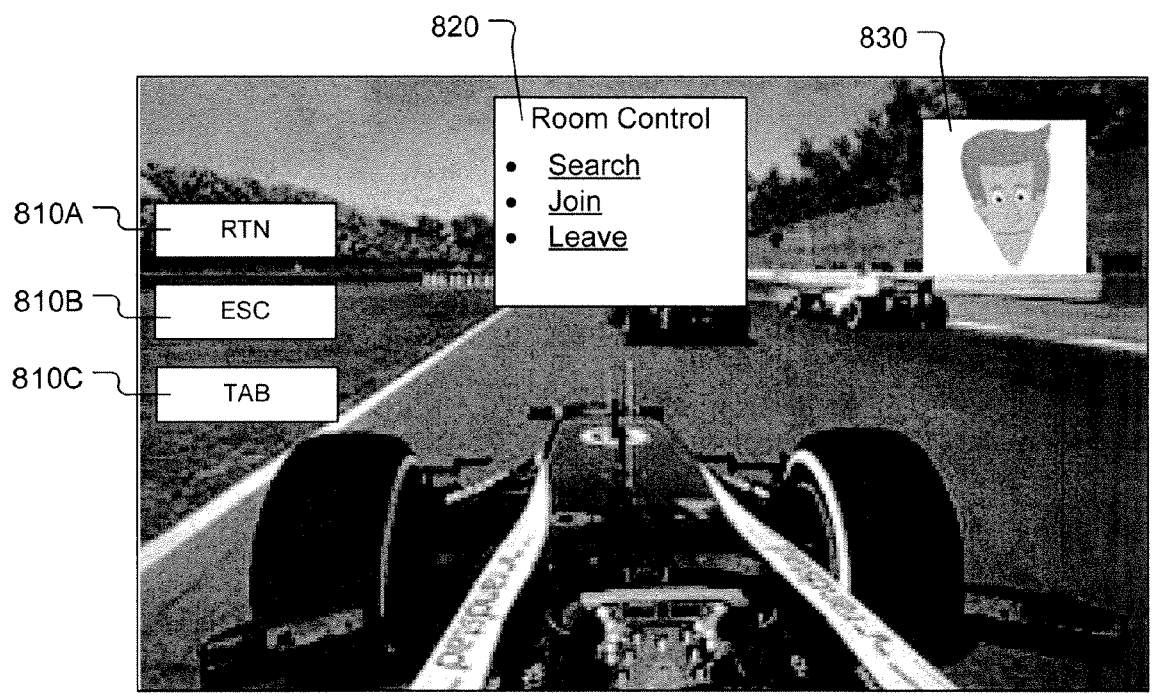
FIG. 3 shows overlays on game video (a video frame), according to various embodiments of the invention.

FIG. 3 shows overlays on game video (a video frame), according to various embodiments of the invention. Three overlays 810A, 810B, and 810C (collectively identified as overlays 810) have been applied to the video generated by the video game. These overlays 810 may be applied as a single overlay or as several separate overlays.

In one example, embodiment, each of the overlays 810 represents a different game control input as indicated by the text therein. Overlay 810A represents a carriage return, overlay 810B represents an escape key, and overlay 810C represents a tab key. It should be appreciated that in other embodiments, the overlays 810 can identify controller commands. For example, the overlays 810A, 810B, and 810C, may show icons for different game controller actions (e.g., button press, stick movement, tilt direction, shake, etc.) with a corresponding descriptive action term. In some embodiments, these overlays 810 are associated with specific regions of the video frame and these specific regions are mapped to the represented game control input. For example, the region of the image occupied by overlay 810C is mapped to the tab key such that clicking on or otherwise making a selection in this region is interpreted as a tab keystroke. Selection can be accomplished by using a pointing device such as a joystick or mouse, or by touching this region on a touch sensitive screen.

FIG. 3 further includes an overlay 820 representing a game menu, such as may be used to manage a game room or other aspect of game execution. Overlay 820 includes a plurality of active regions mapped to different game commands (inputs). For example, the area occupied by the word "search" within overlay 820 is mapped to a search command while the area occupied by the word "join" is mapped to a command to join a game room.

FIG. 3 further includes an overlay 830 including an image of a game player. Overlay 830 may be a static or real-time image of another game player. For example, if the video frame illustrated in FIG. 3 is to be sent to client 110A, then overlay 830 may include a real-time video frame of a player of client 110B. The overlay 830 may alternatively include a view of the video game from another player's point of view, a view from a second point of view for a same player, or a view of some real-life event. In one example, overlay 830 includes a video frame based on a second point of view of the same player whose first point of view was used to generate the underlying image. This second point of view can be generated using a second video DEP 245. The number, shape, size, and characteristics of overlays that may be placed over video data can vary widely. Overlays may or may not be mapped to game commands. Overlays can be applied either server and/or client side. Some embodiments include overlays applied both server and client side.

The mapping of user inputs to game commands is not limited to applications in which clients 110 include a touch screen or pointing device. The mapping of user inputs to specific game commands can occur at clients 110 or at video server system 120. For example, the iPad® from Apple Computer, Inc. is configured to convert touches to its screen, movements, and combinations of touches to specific commands. The iPad® and iPhone® are also configured to convert movements of the device itself to specific commands. However, other types of clients 110 may not have these capabilities, in which case the mapping can occur at video server system 120.

Figure 4:
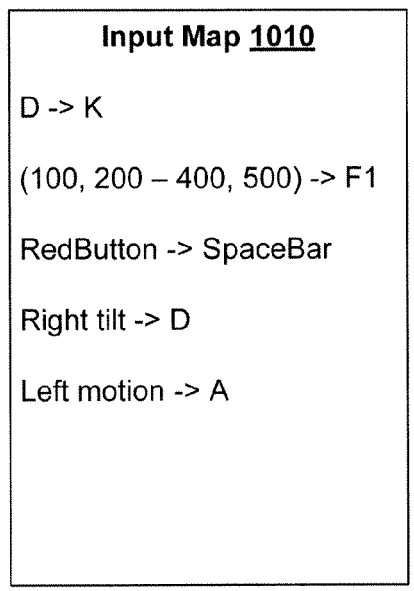
FIG. 4 shows part of an input map configured for mapping of user inputs to game commands, according to various embodiments of the invention.

Mapping of user inputs to game commands is optionally performed using a look-up table or other type of input mapping. FIG. 4 shows part of an input map 1010 configured for mapping of user inputs to game commands, according to various embodiments of the invention. It should be understood that an input map 1010 for command mapping can include more or less entries than shown in FIG. 4.

The first mapping shown in input map 1010 is a direct character to character map of "D" to "K." This type of mapping may be useful in games that are configured for several players to share a keyboard, each using their own subset of the keys, by way of example. When such a game is played by geographically disperse game players, each player may use the same keys but one of the player's inputs are mapped to a different part of the keyboard.

The second mapping shown in input map 1010 includes mapping of a screen area to a key. Specifically, a rectangle with corners at (100, 200) and (400, 500) is mapped to the F1 function key. The coordinates can be in image, window, or screen pixels. This type of mapping is useful when a touch screen or pointing device is used as an input. This type of mapping can be used to map images within an overlay to specific game commands. This type of mapping can also be dependent on movement of a finger or cursor on a screen, or the number of points at which a touch screen is touched.

The third type of mapping shown in input map 1010 includes mapping of a controller button to a key. Specifically, a "Redbutton" is mapped to a "Spacebar." This type of mapping can be used to map game controller inputs to specific game commands. It should be understood that in some embodiments of the present invention, a game controller, and any function thereof (e.g., button, stick, tilt, shake, etc.), can be mapped to a corresponding game command.

The fourth type of mapping shown in input map 1010 includes mapping motion ("Right Tilt") of an input device to a key. This type of mapping can be used with joysticks, iPhones®, iPads®, the Nintendo Wii®, or other type of clients 110 with motion or location sensing capabilities.

The fifth type of mapping shown in input map 1010 includes mapping of a movement of an object as detected by an external device, such as a camera, to a key "A." This type of mapping is optionally used in clients 110 that include radio or video motion detection systems. Using this type of mapping allows games designed to be played using a keyboard to be played using new types of input devices, such as the Kinect® from Microsoft.

A sixth type of mapping may be dynamic. For example, in embodiments where motion of a finger on a touch screen is mapped to joystick movements, where the finger first touches the screen may be dynamically mapped to the joystick "center" position. Screen positions just above, below, right, left, etc., of the first touch position are mapped to joystick positions up, down, left, right, etc., respectively. As such, a joystick movement can be entered by first placing a finger on the screen and then sliding the finger in some direction. Dynamic mapping may also include multi-finger touches to the screen. For example, a touch on a first point of the screen can determine the location and orientation of a mapping used to convert a second touch to a game command.

Figure 5:
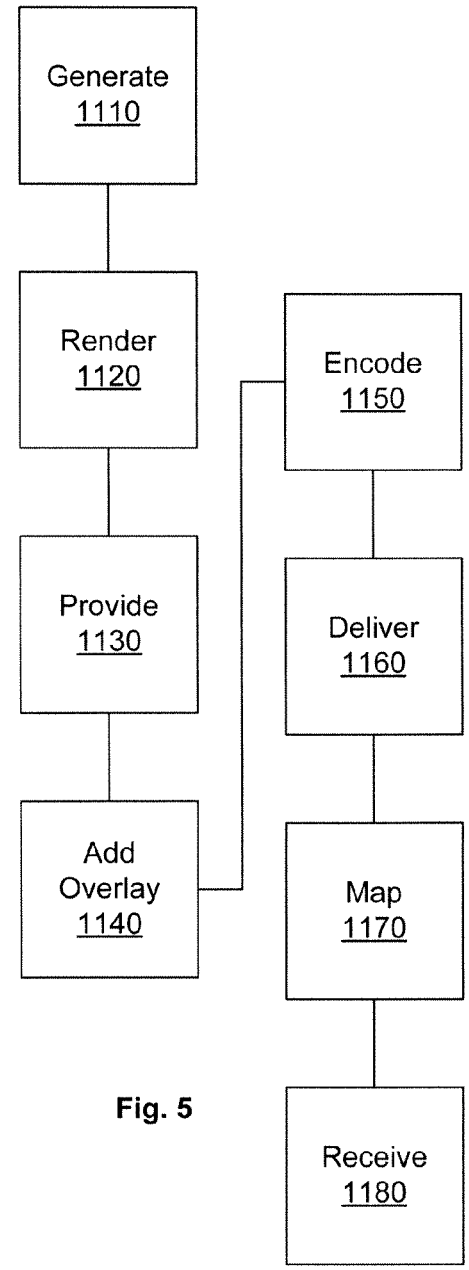
FIG. 5 shows methods of using an overlay, according to various embodiments of the invention.

FIG. 5 shows methods of using an overlay, according to various embodiments of the invention. The overlay can be audio or video. In the method of FIG. 5, a video frame is generated using graphics processing unit 235 and an overlay is added to this video frame prior to encoding. The method operations shown in FIG. 5 can optionally be performed in parallel using several of game logic 210, several of video DEP 245 and/or several of audio DEP 270.

Specifically, in a Generate Step 1110, a game environment is generated based on game rules and game commands received via Network 115 and clients 110 from one or more game players. For example, a game player at client 110A and a game player at client 110B may each provide a game command that is used to update a game state from which the game environment is generated. Generate Step 1110 may include Receive State Step 515 and Determine 3D Data Step 520, as discussed with regard to FIG. 4. In some embodiments, Generate Step 1110 includes generating audio data based on events within the game, the game rules, and/or received game commands.

In an optional Render Step 1120, the game environment generated in Generate Step 1110 is rendered using graphical processing unit 235. Render Step 1120 is an embodiment of Render Step 525 discussed with regard to FIG. 4. The result of Render Step 1120 is a video frame. Render Step 1120 is optional in embodiments where the result of Generate Step 1110 includes only audio data and/or does not include a 3D game environment.

In a Provide Step 1130, the video frame generated in Render Step 1120 and/or the audio data generated in Generate Step 1110 is provided to one or more encoding pipelines, such as video DEP 245A and/or audio DEP 270A. For example, a video frame may be provided to video DEP 245A while an audio frame is provided to audio DEP 270A. Provide Step 1130 is an embodiment of Transfer Step 527 as discussed with regard to FIG. 4.

In an Add Overlay Step 1140, a video overlay is added to the video frame provided in Provide Step 1130, and/or an audio overlay is added to audio data provided in Provide Step 1130. Add Overlay Step 1140 is typically performed using Overlay Logic 290 and/or Overlay Logic 295 as discussed with regard to FIG. 2. More than one video overlay and more than one audio overlay are optionally added in Add Overlay Step 1140. The audio overlay optionally includes audio data received from one or more of clients 110 as packets via network 115. For example, the audio overlay can include voice data of game players received from multiple clients 110.

In some embodiments, video source 130 receives audio data from many clients 110, and the Add Overlay Step 1140 includes determining which of the audio data should be used in a particular audio overlay. For example, while 10 game players may be using video source 130, only the voice data of two or three of these players may be included in the audio overlay. The determination of which audio data to include in an overlay is optionally based on a social relationship between game players. For example, one game player may select which, i.e., whose, voice data he wishes to receive. The social relationships can include membership in a guild, party, being in a same battleground, or game instance, and/or having avatars located near each other in the same game environment, among others. In some embodiments, the volume of audio data is adjusted responsive to an in-game distance between two avatars.

In an Encode Step 1150, the video frame and/or audio data, as well as any overlays are encoded. This can be accomplished using encoder 255 and/or audio encoder 280. Encode Step 1150 is an embodiment of Encode Step 535. Encode Step 1150 may be performed before or after Add Overlay Step 1150.

In a Deliver Step 1160, the video frame and/or audio data encoded in Encode Step 1150 is provided to one of clients 110 via network 115. The video frame and/or audio data are optionally provided to more than one location. For example, the same data can be provided to more than one game player. Deliver Step 1160 is an embodiment of Provide Step 545 discussed with regard to FIG. 4.

In an optional Map Step 1170, part of a video overlay applied in Add Overlay Step 1140 is mapped to a game command. For example, a region of the video frame to which the video overlay was added can be set in a input map 1010 as mapping to a specific game command. An overlay can be applied to more than one region of a display or a video frame. Each region is optionally mapped to a different game command. The input map 1010 can be located on video server system 120 or one of clients 110.

In an optional Receive Step 1180, a mapped game command is received at or within video source 130. The mapped game command is optionally a command that has been mapped from a region of a video frame to which an overlay was applied. The received game command may have been mapped at either one of clients 110 or at video server system 120. The received game command is optionally used to update a state of the video game.

Figure 6:
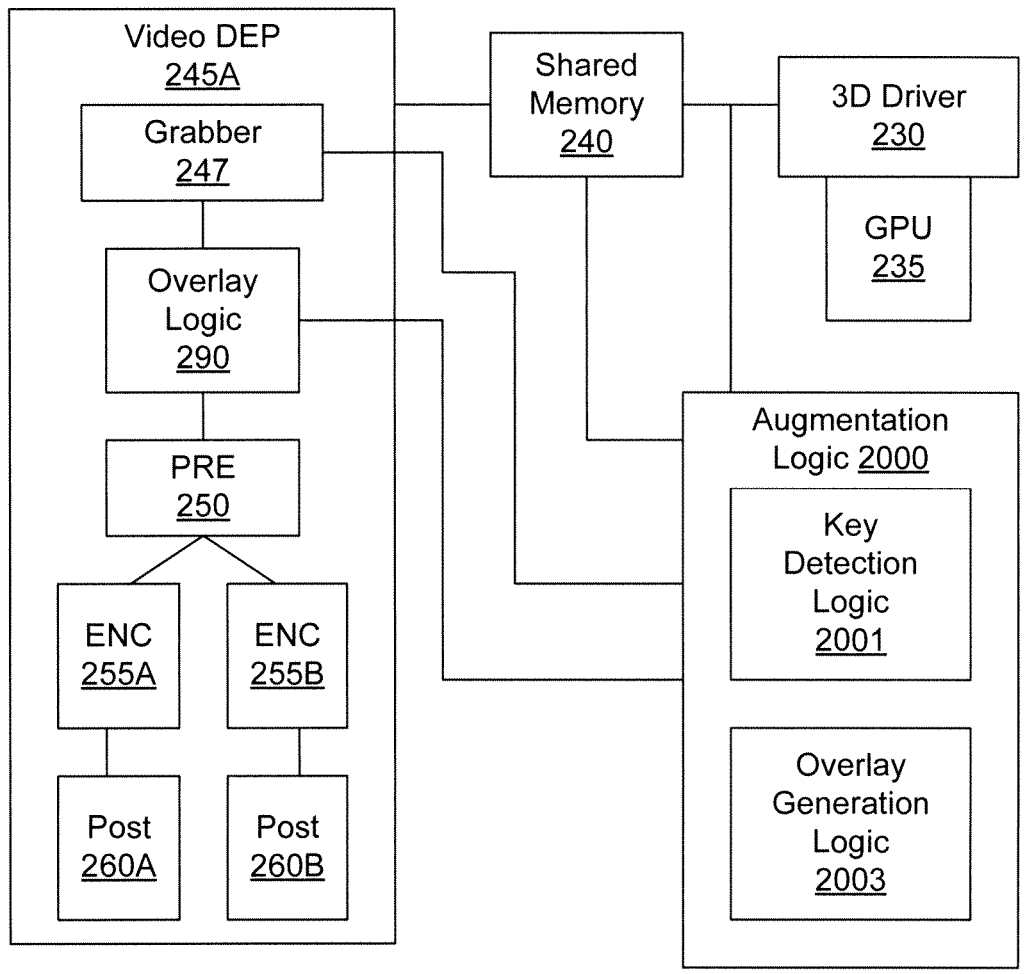
FIG. 6 shows an extension of the video source to include video augmentation logic, in accordance with an example embodiment of the present invention.

FIG. 6 shows an extension of the video source 130 to include video augmentation logic 2000, in accordance with an example embodiment of the present invention. The augmentation logic 2000 is defined to analyze video frame data provided by either the 3D driver 230 to detect the presence of key graphical images therein, and to provide image overlay data to the overlay logic 290 in response to detecting the presence of the key graphical images. In various embodiments, the augmentation logic 2000 can be defined to access and obtain video frame date from one or more of the virtual 3D video driver 220, the 3D driver 230, the shared memory 240, and/or the video DEP 245 by way of the grabber 247. It should be appreciated that the video frame data is received and processed by the augmentation logic 2000 before the video frame data is encoded for transmission from the video DEP 245 to one or more of clients 110.

The augmentation logic 2000 includes key detection logic 2001 defined to search the received video frame data for the presence of a target pixel pattern corresponding to a key graphical image. Depending on the implementation, the key detection logic 2001 can be directed to search a portion of an entire video frame or the entire video frame for the presence of the target pixel pattern. The particular searching technique employed by the key detection logic 2001 at a given time is referred to as the target search pattern. The augmentation logic 2000 can be instructed as to what target pixel pattern is to be searched and which target search pattern is to be used.

Figure 7:
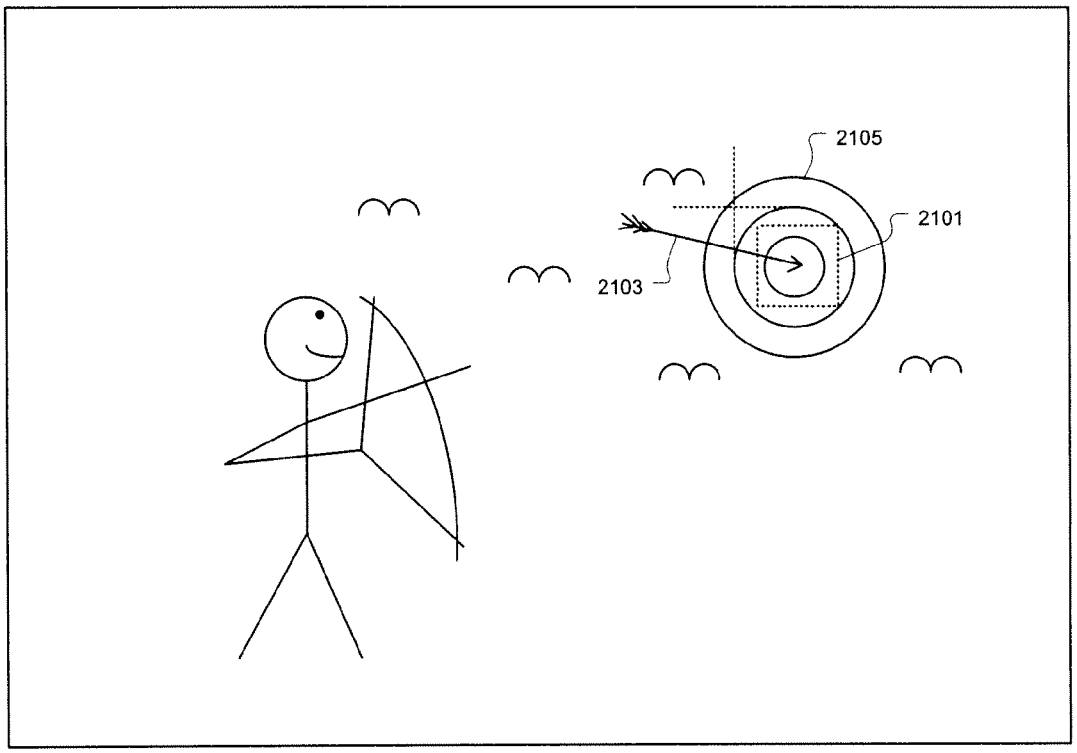
FIG. 7 shows an example of a video frame image corresponding to video frame data to be processed by the augmentation logic.

FIG. 7 shows an example of a video frame image corresponding to video frame data to be processed by the augmentation logic 2000. It should be understood that the video frame image of FIG. 7 is provided by way of example and in no way limits any feature or aspect of the invention discussed herein. In the example video frame image of FIG. 7, a key graphical image 2101 corresponding to a target pixel pattern is shown. The key detection logic 2001 function to search the video frame data in accordance with a specified target search pattern to detect the presence of the target pixel pattern corresponding to the key graphical image 2101. In one embodiment, the target search pattern is a rasterized search pattern through the video frame image from side-to-side and from top-to-bottom. In another embodiment, the target search pattern includes multiple rasterized search patterns through different regions of the video frame in a simultaneous manner. In one example of this embodiment, the different regions of the video frame are defined such that the different regions do not overlap and such that the different region together cover an entirety of the video frame.

Also, in one embodiment, the key detection logic 2001 can be defined to implement the search for the key graphical image in a multi-step sub-target manner. Specifically, the key detection logic 2001 can be directed to first search the video frame for an indicator portion of the target pixel pattern corresponding to a portion of the key graphical image. In one embodiment, the portion of the target pixel pattern may corresponding to a pixel set that includes sharp contrasts and/or distinctive colors. Then, upon detecting the presence of the indicator portion of the target pixel pattern, the key detection logic 2001 can be directed to perform a focused search for the target pixel pattern within a vicinity of the detected indicator portion of the target pixel pattern. It should be understood that search and detection of the indicator portion of the target pixel pattern may be performed in a faster manner than search and detection of the entire target pixel pattern, thereby increasing an efficiency of the overall search and detection of the target pixel pattern.

In one embodiment, the augmentation logic 2000 is defined to monitor a game state of game logic 210 and be responsive to the monitored game state. More specifically, the augmentation logic 2000 can be directed to utilize a specific target pixel pattern dependent on the monitored game state and/or utilize a specific target search pattern dependent on the monitored game state. The augmentation logic 2000 can be defined to receive and operate in accordance with game-specific augmentation program instructions that provide directives as to which target pixel pattern and target search patterns are to be employed as a function of monitored game state.

Figure 8:
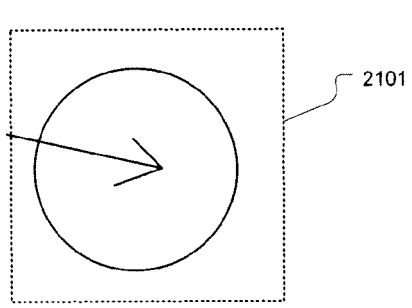
FIG. 8 shows an example target pixel pattern associated with the example video frame image of FIG. 7.

For example, with reference to FIG. 7, the augmentation logic 2000 can be notified of the game state in which an arrow image 2103 may be encountering a target image 2105. Based on notification of this game state, the augmentation logic 2000 can be instructed to use a particular target pixel pattern as shown in FIG. 8, and use a target search pattern that includes only the region of the video frame in which the target image 2105 is positioned, thereby focusing the efforts of the key detection logic 2001.

Also, the game-specific augmentation program instructions can include instructions as to how an overlay image is to be generated and positioned within the video frame upon detection of the target pixel pattern in the video frame. The augmentation logic 2000 includes overlay generation logic 2003 defined to generate the overlay image in accordance with instructions received by the augmentation logic 2000. The overlay generation logic 2003 is defined to communicate overlay construction data to the overlay logic 290. The overlay construction data includes relevant overlay pixel data and data to direct positioning of the overlay image in the video frame. As described herein, the overlay logic 290 functions to insert an overlay image in a video frame by modifying appropriate pixel data of the video frame to render the overlay image. With the augmentation logic 2000 in effect, the overlay logic 290 is defined to insert overlay images in accordance with the overlay construction data received from the augmentation logic 2000.

Figure 9:
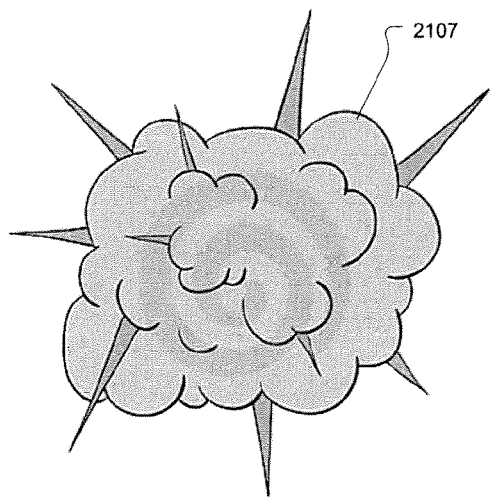
FIG. 9 shows an overlay image to be communicated in the form of overlay construction data from the overlay generation logic to the overlay logic.

For example, FIG. 9 shows an overlay image 2107 to be communicated in the form of overlay construction data from the overlay generation logic 2003 to the overlay logic 290. In one embodiment, the overlay generation logic 2003 for each game state is stored in the shared memory 240 and is indexed to its corresponding game state and target pixel data, such that the overlay generation logic 2003 can retrieve the required overlay construction data from the shared memory 240 depending on the game state information transmitted to the augmentation logic 2000, and transmit the required overlay construction data to the shared memory 240. In one embodiment, the overlay construction data for various overlay images can be obtained from a database to which the augmentation logic 2000 has access. And, in one embodiment, the overlay construction data to be used can be dependent upon parameters external to the game state, such as an identify of the user playing the game or other data related to the user playing the game, such as an expertise level of the user playing the game.

Figure 10:
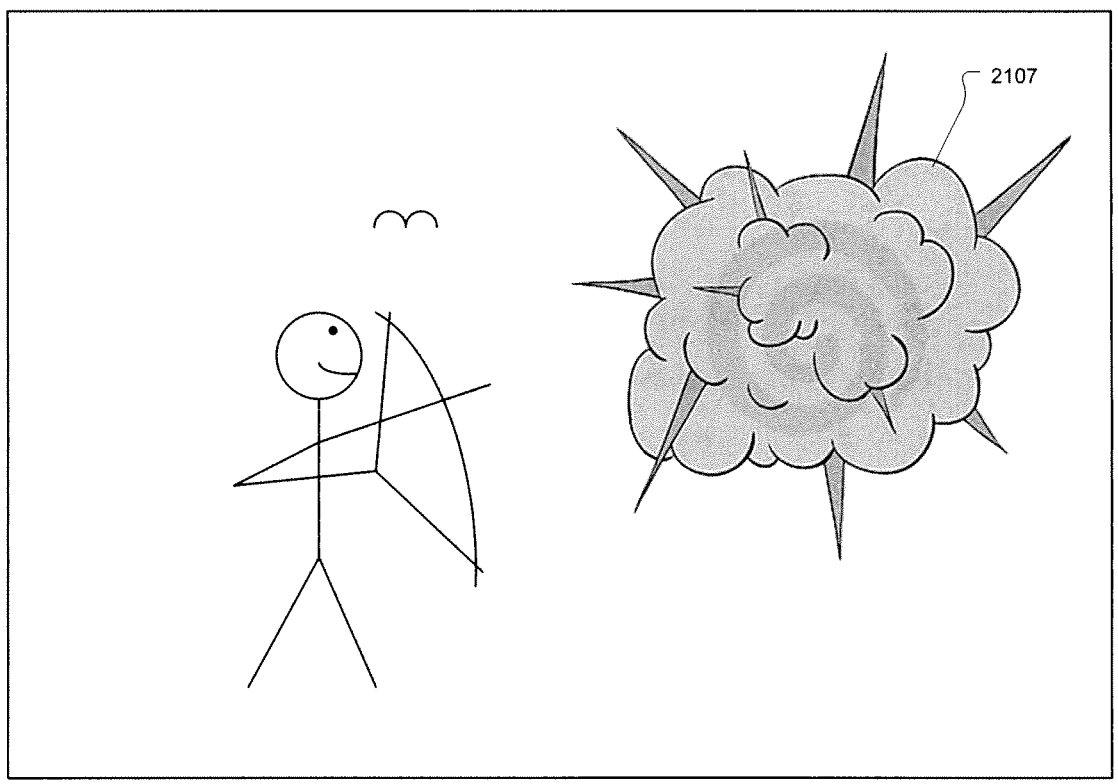
FIG. 10 shows the video frame of FIG. 7 following insertion of the overlay image in response to the key detection logic detecting the presence of the target pixel pattern corresponding to the key graphical image as shown in FIG. 8.

Once the overlay construction logic is provided from the overlay generation logic 2003 to the overlay logic 290, the overlay logic 290 functions to apply/insert the corresponding overlay image in the video frame. For example, FIG. 10 shows the video frame of FIG. 7 following insertion of the overlay image 2107 in response to the key detection logic 2001 detecting the presence of the target pixel pattern corresponding to the key graphical image 2101 as shown in FIG. 8. It should be understood that insertion of the overlay image 2107 can be accomplished by overlaying (or replacing) pixel data within the video frame with pixel data of the overlay image 2107. It should be appreciated, that detection of key graphical images within a video frame associated with a specific game state and corresponding generation and insertion of overlay images, as provided by the augmentation logic 2000, provides a substantial ability to modify the look and feel of a game without actually modifying the underlying program instructions of the game. Additionally, it should be appreciated that in some embodiments, the insertion of overlay images can be used to convey/render advertisement images to a user/player of the game.

Moreover, it should be understood that overlay images, or portions thereof, can be responsive to user supplied commands by way of the input map as described with regard to FIG. 4. In this manner, detection of key graphical images within a video frame associated with a specific game state and corresponding generation and insertion of overlay images, as provided by the augmentation logic 2000, can be used to actually modify the functionality of the game without actually modifying the underlying program instructions of the game.

It should be understood that the key detection logic 2001 can be directed to search for and detect one or more target pixel patterns, in accordance with one or more target search patterns, in a given video frame. Also, it should be understood that the overlay generation logic 2003 can be directed to generate overlay construct data for one or more overlay images for a given video frame. Thus, in some instances, the overlay logic 290 will receive overlay construct data for multiple overlay images to be applied to a single video frame. In this case, the multiple overlay images can be related or unrelated and can be respectively positioned at different locations in the video frame.

Figure 11:
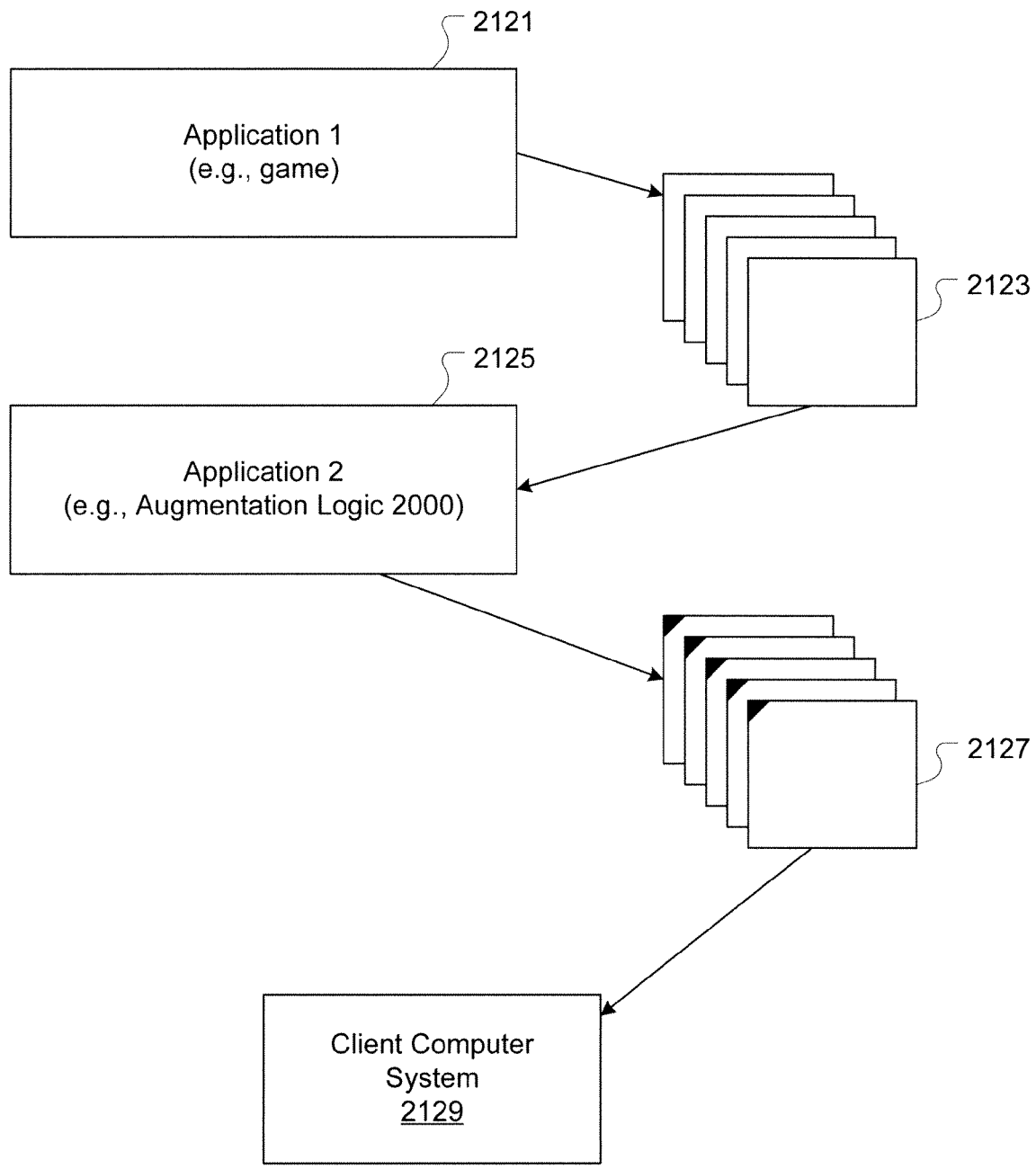
FIG. 11 shows a system for augmenting a remotely served application, in accordance with one embodiment of the present invention.

FIG. 11 shows a system for augmenting a remotely served application, in accordance with one embodiment of the present invention. The system includes a first application 2121 executing on one or more computing systems. In one embodiment, the one or more computing systems on which the first application 2121 is executing include one or more virtual computing machines operating on a cloud computing system. In one embodiment, the first application 2121 is a game application. The first application 2121 executes to generate a series of original frame pixel data sets 2123 for rendering of graphical images associated with the first application execution. The series of original frame pixel data sets 2123 corresponds to a video stream, and each original frame pixel data set corresponds to a respective video frame.

The system of FIG. 11 also includes a second application 2125 executing on one or more computing systems to detect one or more key graphical images present in the series of original frame pixel data sets. In one embodiment, the one or more computing systems on which the second application 2125 is executing include one or more virtual computing machines operating on a cloud computing system. In one embodiment, the second application 2125 corresponds to the augmentation logic 2000 discussed with regard to FIG. 6. Also, the key graphical images can represent the status of execution of first application 2121.

Upon detection of the one or more key graphical images by the second application 2125, the second application operates to direct replacement of a portion of pixel data in the series of original frame pixel data sets 2123 with substitute pixel data so as to generate a series of modified frame pixel data sets 2127. The series of modified frame pixel data sets 2127 is provided for encoding and transmission to a client computer system 2129 in lieu of the series of original frame pixel data sets 2123 for rendering in a visual display of the client computer system 2129. In one embodiment, the second application 2125 operates to provide instructions to an overlay module, such as overlay logic 290, to direct replacement of the portion of pixel data in the series of original frame pixel data sets 2123 with substitute pixel data.

Figure 12:
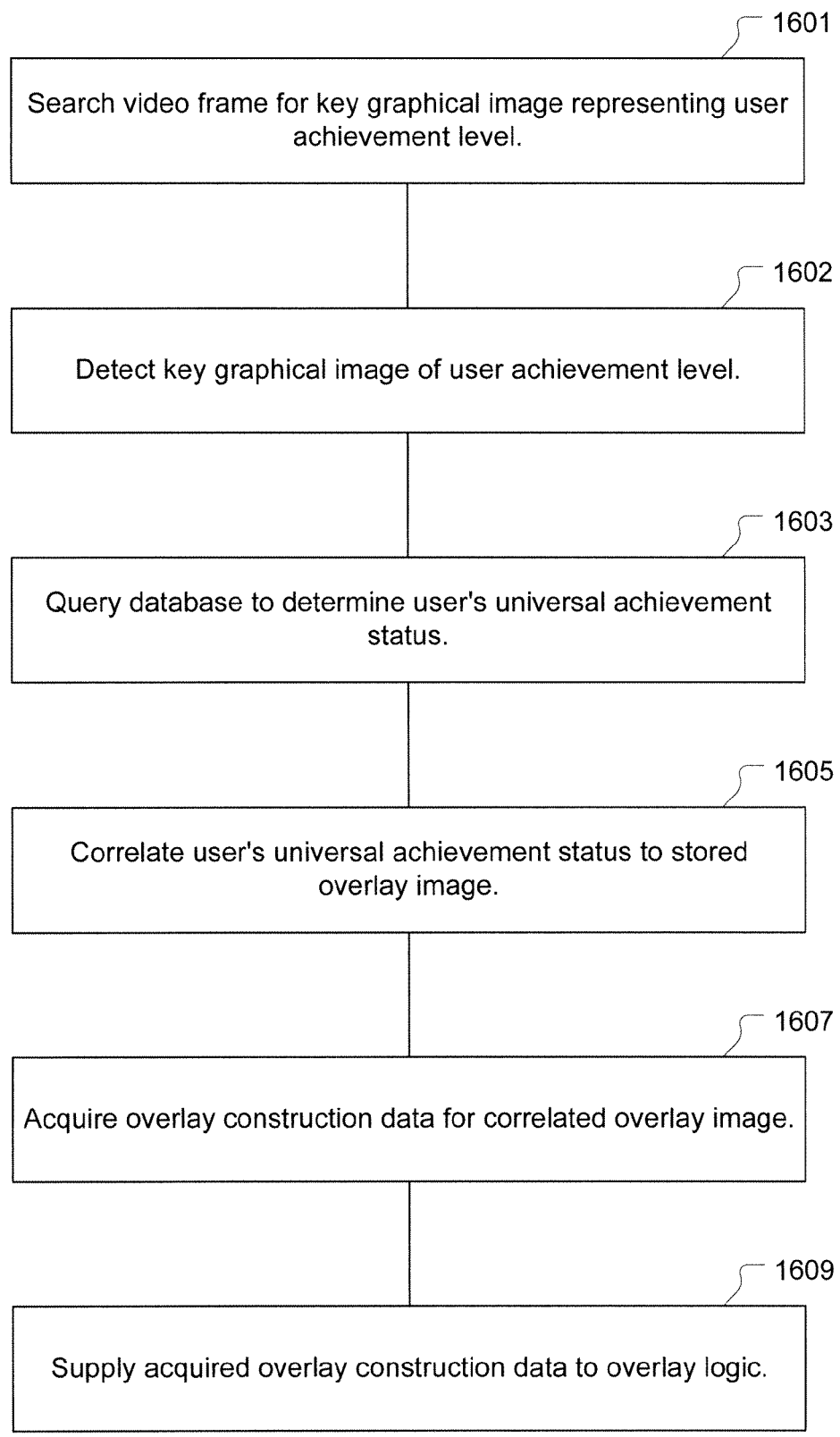
FIG. 12 shows a method for augmenting a remotely served application, in accordance with one embodiment of the present invention.

FIG. 12 shows a method for augmenting a remotely served application, in accordance with one embodiment of the present invention. It should be understood that the method of FIG. 12 can be implemented using the augmentation logic 2000 discussed with regard to FIG. 6. The method includes an operation 1601 for searching a video frame generated by an application to detect a key graphical image, where the key graphical image represents a user's level of achievement in execution of the application. The method also includes an operation 1602 for detecting the key graphical image in the video frame generated by the application. In one embodiment, the application is a remotely served game application executing on a virtual machine of a cloud computing platform. The user's level of achievement may be rendered in an essentially limitless number of different ways. However, depending on the application being executed, an expected location in the video frame and an expected pixel pattern of the key graphical image representing the user's level of achievement can be known before searching the video frame, thereby enabling a focused search in operation 1601.

Once the key graphical image corresponding to the user's level of achievement is detected in the video frame generated by the application, the method proceeds with an operation 1603 to obtain an overlay image representing a universal achievement status of the user. The universal achievement status of the user can represent the user's level of accomplishment in executing one or more applications, e.g., games, of one or more types over a period of time. In one embodiment, the operation 1603 can include querying of a database of user information to determine the user's universal achievement status.

The method also includes an operation 1605 for correlating the user's determined universal achievement status to one or more of a number of predefined overlay images stored on a data storage device. An operation 1607 is then performed to acquire overlay construction data from the data storage device for at least one of the number of predefined overlay images correlated to the user's determined universal achievement status. An operation 1609 is then performed to supply the acquired overlay construction data to overlay logic, e.g., overlay logic 290, for insertion of the at least one of the predefined overlay images in the video frame to be encoded and transmitted to the user's computing system. Within the context of a gaming universe, it should be understood that the method of FIG. 12 allows a user's universal achievement status in playing a number of similar and/or different games to be visually rendered in a unique way in video stream of any game that the user is playing. Also, by way of the key graphical image detection and overlay process, the user's universal achievement status can be visually rendered in place of an image normally generated by a game to indicate the user's level of achievement in the game.

Figure 13:
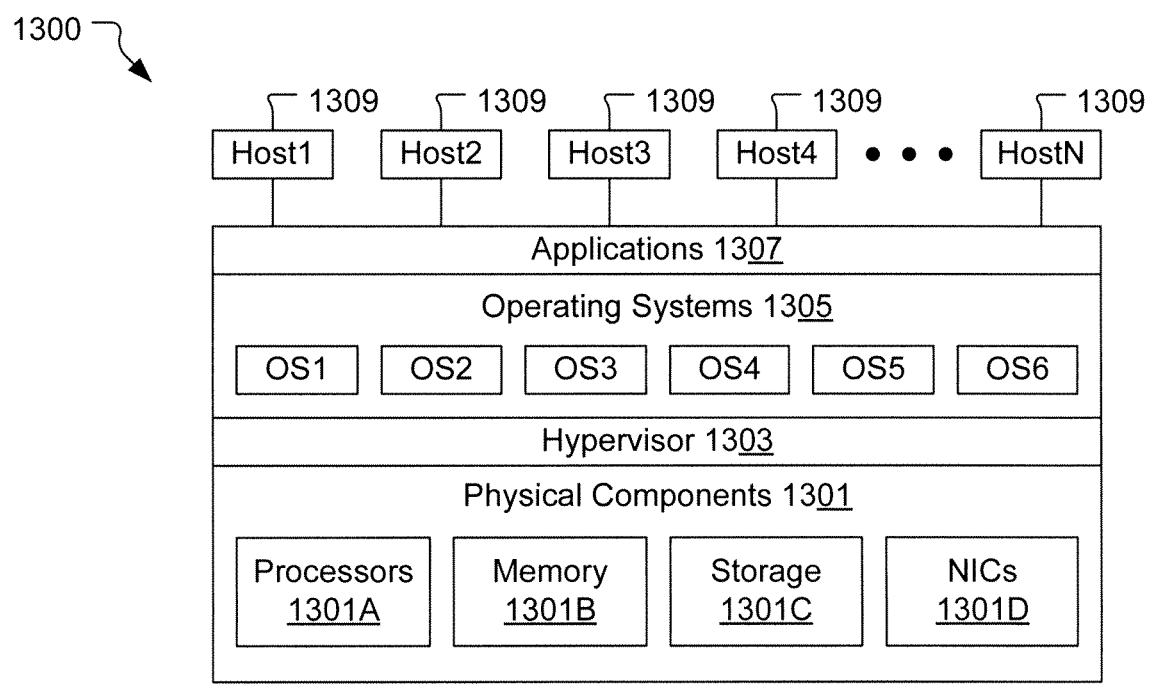
FIG. 13 shows a diagram of a cloud computing system for generation and execution of a remotely served computer application, in accordance with one embodiment of the present invention.

FIG. 13 shows a diagram of a cloud computing system 1300 for generation and execution of a remotely served computer application, e.g., computer game, in accordance with one embodiment of the present invention. The cloud computing system 1300 includes various physical components 1301, i.e., computing hardware components, defined to perform the operations necessary for computing activity. The physical components 1301 can include a number of computer processors 1301A, an amount of computer memory 1301B, an amount of persistent data storage 1301C, and a number of network interface cards/chips (NICs) 1301D. The various physical components 1301 mentioned above may correspond to any such physical component 1301 known in the art. Also, it should be understood that the various physical components 1301 mentioned above are provided by way of example. Various embodiments of the cloud computing system 1300 can include more or less physical components 1301 than the examples mentioned above, and can include physical components 1301 not mentioned above, e.g., power supplies, cooling systems, etc., so long as the integrated computing capabilities of the physical components 1301 are adequate to ensure proper performance of the cloud computing system 1300.

The cloud computing system 1300 also includes a hypervisor 1303, or similar control layer, that is defined to generate and execute a number of virtual machines using the various physical components 1301. Each virtual machine that is generated and executed by the hypervisor 1303 is essentially a software emulation of a particular computing architecture. Using the various physical components 1301, the hypervisor 1303 can simultaneously generate and execute multiple different virtual machines. A given virtual machine can be directed to operate in accordance with one or more of a number of operating systems 1305 corresponding to the particular computing architecture emulated by the given virtual machine. Examples of various types of operating systems include Windows, Mac OS X, Linux, Play Station 1 (PS1), Play Station 2 (PS2), Play Station 3 (PS3), among others. For example, with regard to FIG. 13, if the operating system OS1 is the PS3 operating system, then OS1 can be executed on a virtual machine generated by the hypervisor 1303 to emulate the PS3 computing architecture. Similarly, if the operating system OS5 is a Mac OS X operating system, then OS5 can be executed on a virtual machine generated by the hypervisor 1303 to emulate a Mac computing architecture.

In the manner described above, the hypervisor 1303 can utilize the physical components 1301 to generate and execute essentially any number of different types of virtual machines for emulating essentially any number of different types of computing architectures upon which various corresponding operating systems can be executed. Therefore, the cloud computing system 1300 can provide an instance of essentially any computing system as defined by a particular operating system executing on its required computing architecture. While the example of FIG. 13, shows six operating systems OS1-OS6 by way of example, it should be understood that the cloud computing system 1300 is not limited in any way to a set number of operating systems. The hypervisor 1303 can be defined to generate a virtual machine for essentially any computing architecture imaginable so as to execute essentially any corresponding operating system imaginable. Therefore, it should be understood that the cloud computing system 1300 is scalable with regard to physical components 1301, hypervisor 1303 capability (i.e., number and type of virtual machine emulation), and number and type of operating system provision.

The cloud computing system 1300 also includes a number of different computer applications 1307 defined for execution through one or more of the number of operating systems 1305. The various computer applications 1307 can be stored in the storage 1301C of the cloud computing system 1300, and can be loaded into memory 1301B for execution as needed in conjunction with provision of a given instance of a particular virtual machine and corresponding operating system by the hypervisor 1303. It should be understood that any computer application 1307 that exists for any operating system 1305 can be executed by the cloud computing system 1300.

FIG. 13 also shows a number of hosts 1309 (Host1-HostN). The hosts 1309 represent an instance of a user having accessed the cloud computing system 1300 to obtain access to an instance of a particular virtual machine and corresponding operating system in order to execute a selected application 1307. It should be understood that the cloud computing system 1300 can be defined and managed to provision virtual machines and operating systems in many different ways. For example, in some cases, each user accessing the cloud computing system 1300 can be provided with a dedicated virtual machine and corresponding operating system upon which the user can execute a desired application 1307. Also, in some cases, multiple users accessing the cloud computing system 1300 can be made to share a virtual machine and corresponding operating system upon which each user can execute their desired applications 1307. Operation and management of the cloud computing system 1300 can be optimized to provide each user accessing the cloud computing system 1300 with the best quality of service possible given the available physical components 1301.

In various embodiments, the cloud computing system 1300 is a cloud gaming system. In one embodiment, the cloud gaming system is configured to detect the type of client device associated with the user, and also a type of controller available for the user to provide input to the cloud-based video game. For example, in one embodiment, when a user logs in to the cloud gaming system, they may be presented with an option to designate the type of client device with which they are accessing the cloud gaming system. In one embodiment, a series of client device options are presented from which the user may select one corresponding to their client device. The user may also be presented with an option to designate the type of controller device they will use to play a video game. In one embodiment, a series of controller options can be presented to the user, from which the user may select to designate a controller type corresponding to their controller hardware. In other embodiments, the cloud gaming system can be configured to automatically detect the client device type and/or the controller device type.

For example, at the time of login, the client device may send information to the cloud gaming server identifying itself as well as a connected controller device (e.g. in response to a request from the cloud gaming server). Based on this information, the cloud gaming server may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device.

It should be appreciated that a given video game may be developed for a specific platform and a specific associated controller device. However, when such a game is made available via a cloud gaming system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlayed during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud gaming server via a network (e.g. accessed via a local networking device such as a router). However, in other embodiments, the controller can itself be a networked device, with the ability to communicate inputs directly via the network to the cloud gaming server, without being required to communicate such inputs through the client device first. For example, the controller might connect to a local networking device (such as the aforementioned router) to send to and receive data from the cloud gaming server. Thus, while the client device may still be required to receive video output from the cloud-based video game and render it on a local display, input latency can be reduced by allowing the controller to send inputs directly over the network to the cloud gaming server, bypassing the client device.

In one embodiment, a networked controller and client device can be configured to send certain types of inputs directly from the controller to the cloud gaming server, and other types of inputs via the client device. For example, inputs whose detection does not depend on any additional hardware or processing apart from the controller itself can be sent directly from the controller to the cloud gaming server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud gaming server. These might include captured video or audio from the game environment that may be processed by the client device before sending to the cloud gaming server. Additionally, inputs from motion detection hardware of the controller might be processed by the client device in conjunction with captured video to detect the position and motion of the controller, which would subsequently be communicated by the client device to the cloud gaming server. It should be appreciated that the controller device in accordance with various embodiments may also receive data (e.g. feedback data) from the client device or directly from the cloud gaming server.

It should be understood that the cloud computing system 1300 by way of example, or similar computing system, can provide a user with access to a remotely served computer application for execution through the user's computing terminal, so long as the user's computing terminal is capable of accessing the computing system 1300 through a network, i.e., through either a wired network, a wireless network, or a combination thereof. In other words, the cloud computing system 1300 allows a user to execute a computer application of their choosing on the cloud computing system 1300 through the user's terminal, with the underlying hardware, operating system, and computer application provisioned by the cloud computing system 1300.

Several embodiments are specifically illustrated and/or described herein. However, it will be appreciated that modifications and variations are covered by the above teachings and within the scope of the appended claims without departing from the spirit and intended scope thereof. For example, while the examples provided herein are directed to video games, the systems and methods discussed can be applied to other interactive video systems. While the examples provided herein are primarily directed at the delivery of video, the systems and method described herein can be applied to the generation of audio frames and delivery of audio streams. In some embodiments, audio and video streams are generated and delivered together as part of an audio-video stream.

The embodiments discussed herein are illustrative of the present invention. As these embodiments of the present invention are described with reference to illustrations, various modifications or adaptations of the methods and or specific structures described herein may become apparent to those skilled in the art. All such modifications, adaptations, or variations that rely upon the teachings of the present invention, and through which these teachings have advanced the art, are considered to be within the spirit and scope of the present invention. Hence, the descriptions and drawings provided herein should not be considered in a limiting sense, as it is understood that the present invention is in no way limited to only the embodiments illustrated herein.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps.

A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. The logic discussed herein may include hardware, firmware and/or software stored on a computer readable medium. This logic may be implemented in an electronic device to produce a special purpose computing system.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a non-transitory computer readable medium. The non-transitory computer readable medium is any data storage device that can store data, which can be thereafter be read by a computer system. Examples of the non-transitory computer readable medium include hard drives, network attached storage (NAS), read-only memory, random-access memory, CD-ROMs, CD-Rs, CD-RWs, magnetic tapes and other optical and non-optical data storage devices. The non-transitory computer readable medium can include computer readable tangible media distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the method operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for augmenting a remotely served application, comprising:
    searching a video frame generated by an application to detect a key graphical image, wherein the searching is performed based on an expected location of the key graphical image in the video frame, and wherein the searching is performed based on an expected pixel pattern of the key graphical image;
    detecting the key graphical image in the video frame based on the searching;
    obtaining an overlay image representing a universal achievement status of the user associated with one or more games;
    correlating the user's determined universal achievement status to one or more of a number of predefined overlay images stored on a data storage device;
    acquiring overlay construction data from the data storage device for at least one of the number of predefined overlay images correlated to the user's determined universal achievement status;
    supplying the acquired overlay construction data to overlay logic, the overlay logic operating to insert the at least one of the predefined overlay images in the video frame;
    encoding the video frame, using an encoder, with the at least one of the predefined overlay images inserted therein; and
    transmitting the encoded video frame to a computing system of the user.

2. A method for augmenting a remotely served application as recited in claim 1, wherein the key graphical image represents a user's level of achievement in execution of the application.

3. A method for augmenting a remotely served application as recited in claim 1, wherein the application is a remotely served game application executing on a virtual machine of a cloud computing platform.

4. A method for augmenting a remotely served application as recited in claim 1, wherein the universal achievement status of the user represents the user's level of accomplishment in executing one or more applications of one or more types over a period of time.

5. A method for augmenting a remotely served application as recited in claim 1, wherein obtaining the overlay image includes querying of a database of user information to determine the user's universal achievement status.

6. A data storage device having program instructions stored thereon for augmenting a remotely served application, comprising:
    program instructions for searching a video frame generated by an application to detect a key graphical image, wherein the searching is performed based on an expected location of the key graphical image in the video frame, and wherein the searching is performed based on an expected pixel pattern of the key graphical image;
    program instructions for detecting the key graphical image in the video frame based on the searching;
    program instructions for obtaining an overlay image representing a universal achievement status of the user associated with one or more games;
    program instructions for correlating the user's determined universal achievement status to one or more of a number of predefined overlay images stored on a data storage device;

program instructions for acquiring overlay construction data from the data storage device for at least one of the number of predefined overlay images correlated to the user's determined universal achievement status;

program instructions for supplying the acquired overlay construction data to overlay logic, the overlay logic operating to insert the at least one of the predefined overlay images in the video frame;

program instructions for providing the video frame as output from the overlay logic to an encoder, the encoder operating to encode the video frame; and program instructions for transmitting the encoded video frame to a computing system of the user.

7. A data storage device having program instructions stored thereon for augmenting a remotely served application as recited in claim 6, wherein the key graphical image represents a user's level of achievement in execution of the application.

8. A data storage device having program instructions stored thereon for augmenting a remotely served application as recited in claim 6, wherein the application is a remotely served game application executing on a virtual machine of a cloud computing platform.

9. A data storage device having program instructions stored thereon for augmenting a remotely served application as recited in claim 6, wherein the universal achievement status of the user represents the user's level of accomplishment in executing one or more applications of one or more types over a period of time.

10. A data storage device having program instructions stored thereon for augmenting a remotely served application as recited in claim 6, wherein the program instructions for obtaining the overlay image includes program instructions for querying of a database of user information to determine the user's universal achievement status.

11. A method for augmenting a remotely served application as recited in claim 1, wherein the at least one of the predefined overlay images that is inserted into the video frame by the overlay logic is an overlay image of an advertisement.

12. A method for augmenting a remotely served application as recited in claim 1, wherein the method is executed by a cloud computing system.

13. A method for augmenting a remotely served application as recited in claim 12, wherein the cloud computing system is configured to provide streaming video content to the computing system of the user, the transmitted encoded video frame included as part of the streaming video content.

14. A data storage device having program instructions stored thereon for augmenting a remotely served application as recited in claim 6, wherein the at least one of the predefined overlay images that is inserted into the video frame by the overlay logic is an overlay image of an advertisement.

15. A data storage device having program instructions stored thereon for augmenting a remotely served application as recited in claim 6, wherein the program instructions for augmenting the remotely served application are executed by a cloud computing system.

16. A data storage device having program instructions stored thereon for augmenting a remotely served application as recited in claim 15, wherein the cloud computing system is configured to provide streaming video content to the computing system of the user, the transmitted encoded video frame included as part of the streaming video content.

17. A method for augmenting a remotely served application, comprising:

searching a video frame generated by an application for a key graphical image;

detecting the key graphical image in the video frame as a result of the searching;

obtaining an overlay image representing a universal achievement status of the user associated with one or more games, wherein the universal achievement status of the user represents the user's level of accomplishment in executing one or more applications of one or more types over a period of time;

correlating the user's determined universal achievement status to one or more of a number of predefined overlay images stored on a data storage device;

acquiring overlay construction data from the data storage device for at least one of the number of predefined overlay images correlated to the user's determined universal achievement status;

supplying the acquired overlay construction data to overlay logic, the overlay logic operating to insert the at least one of the predefined overlay images in the video frame;

encoding the video frame, using an encoder, with the at least one of the predefined overlay images inserted therein; and transmitting the encoded video frame to a computing system of the user.

18. A method for augmenting a remotely served application as recited in claim 17, wherein the at least one of the predefined overlay images that is inserted into the video frame by the overlay logic is an overlay image of an advertisement.

19. A method for augmenting a remotely served application as recited in claim 17, wherein the method is executed by a cloud computing system.

20. A method for augmenting a remotely served application as recited in claim 19, wherein the cloud computing system is configured to provide streaming video content to the computing system of the user, the transmitted encoded video frame included as part of the streaming video content.

21. A method for augmenting a remotely served application, comprising:

searching a video frame generated by an application for a key graphical image;

detecting the key graphical image in the video frame as a result of the searching;

obtaining an overlay image representing a universal achievement status of the user associated with one or more games, wherein obtaining the overlay image includes querying of a database of user information to determine the user's universal achievement status;

correlating the user's determined universal achievement status to one or more of a number of predefined overlay images stored on a data storage device;

acquiring overlay construction data from the data storage device for at least one of the number of predefined overlay images correlated to the user's determined universal achievement status;

supplying the acquired overlay construction data to overlay logic, the overlay logic operating to insert the at least one of the predefined overlay images in the video frame;

encoding the video frame, using an encoder, with the at least one of the predefined overlay images inserted therein; and transmitting the encoded video frame to a computing system of the user.

22. A method for augmenting a remotely served application as recited in claim 21, wherein the at least one of the predefined overlay images that is inserted into the video frame by the overlay logic is an overlay image of an advertisement.

23. A method for augmenting a remotely served application as recited in claim 21, wherein the method is executed by a cloud computing system.

24. A method for augmenting a remotely served application as recited in claim 23, wherein the cloud computing system is configured to provide streaming video content to the computing system of the user, the transmitted encoded video frame included as part of the streaming video content.

* * * * *